US012576838B2

(12) United States Patent
Masoero et al.

(10) Patent No.: US 12,576,838 B2
(45) Date of Patent: Mar. 17, 2026

(54) PROCESS AND APPARATUS FOR CONTROLLING THE FORWARD MOVEMENT OF A MOTOR VEHICLE AS A FUNCTION OF ROUTE PARAMETERS IN A DRIVING MODE WITH A SINGLE PEDAL

(71) Applicant: FERRARI S.P.A., Modena (IT)

(72) Inventors: Erik Masoero, Modena (IT); Federico Teodonio, Modena (IT)

(73) Assignee: FERRARI S.P.A. (IT)

( * ) Notice: Subject to any disclaimer, the term of this patent is extended or adjusted under 35 U.S.C. 154(b) by 107 days.

(21) Appl. No.: 18/435,121

(22) Filed: Feb. 7, 2024

(65) Prior Publication Data

US 2024/0262352 A1 Aug. 8, 2024

(30) Foreign Application Priority Data

Feb. 10, 2023 (IT) .......................... 102023000002265

(51) Int. Cl.
| | |
|---|---|
| *B60W 30/14* | (2006.01) |
| *B60K 26/02* | (2006.01) |
| *B60T 7/12* | (2006.01) |
| *B60W 10/04* | (2006.01) |
| *B60W 10/18* | (2012.01) |
| *B60W 50/10* | (2012.01) |

(52) U.S. Cl.
CPC .......... *B60W 30/143* (2013.01); *B60K 26/02* (2013.01); *B60T 7/12* (2013.01); *B60W 10/04* (2013.01); *B60W 10/18* (2013.01); *B60W 50/10* (2013.01); *B60W 2554/40* (2020.02);

*B60W 2555/60* (2020.02); *B60W 2710/18* (2013.01); *B60W 2720/106* (2013.01)

(58) Field of Classification Search
CPC .... B60W 30/143; B60W 10/04; B60W 10/18; B60W 50/10; B60W 2555/60; B60W 2554/40; B60W 2710/18; B60W 2720/106; B60K 26/02; B60T 7/12
See application file for complete search history.

(56) References Cited

U.S. PATENT DOCUMENTS

| | | | |
|---|---|---|---|
| 2009/0234552 A1* | 9/2009 | Takeda | G08G 1/167 701/1 |
| 2013/0173099 A1* | 7/2013 | Takagi | B60W 30/18127 701/22 |

(Continued)

OTHER PUBLICATIONS

Search Report issued in Italian Patent Application No. 202300002265.

*Primary Examiner* — Mohamad O El Sayah
(74) *Attorney, Agent, or Firm* — The Belles Group, P.C.

(57) ABSTRACT

A process for controlling the forward movement of a motor vehicle with a braking device, a control operable between a rest position and an end position, and return means for automatically returning the control to the rest position by a return movement includes the steps of determining at least a first parameter being characteristic of the return movement, determining one or more additional parameters, each of which is representative of one among a morphological state, a regulatory state, a traffic state, and a kinematic state of a portion of the road in front of the motor vehicle, and braking the motor vehicle by controlling the braking device as a function of the first parameter and of the determined additional parameters.

11 Claims, 4 Drawing Sheets

(56)  References Cited

U.S. PATENT DOCUMENTS

| | | | |
|---|---|---|---|
| 2020/0130673 A1 | 4/2020 | Suzuki | |
| 2022/0105925 A1 | 4/2022 | Naserian et al. | |
| 2022/0348202 A1 | 11/2022 | Ostafew et al. | |
| 2024/0270251 A1* | 8/2024 | Petridis | B60W 50/0098 |
| 2024/0308354 A1* | 9/2024 | Shinohara | B60W 30/18109 |

* cited by examiner

PROCESS AND APPARATUS FOR CONTROLLING THE FORWARD MOVEMENT OF A MOTOR VEHICLE AS A FUNCTION OF ROUTE PARAMETERS IN A DRIVING MODE WITH A SINGLE PEDAL

CROSS-REFERENCE TO RELATED APPLICATIONS

This patent application claims priority from Italian patent application no. 102023000002265 filed on Feb. 10, 2023, the entire disclosure of which is incorporated herein by reference.

TECHNICAL FIELD

The invention relates to a process and an apparatus for controlling the forward movement, i.e. in particular the accelerations and the brakings of a motor vehicle as a function of route or road parameters in a driving mode with a single pedal, as well as more in particular as a function of a driving style of a driver of the motor vehicle.

PRIOR ART

The vast majority of the known motor vehicles moves forward or operates under the control of a driver by foot pedals, typically including at least one accelerator pedal and a brake pedal for accelerating and braking, respectively.

On the other hand, the need is felt to provide for a motor vehicle, the forward movement of which can be controllable by the driver by one single pedal, more precisely by what is normally identified as the accelerator pedal.

Therefore, some advanced motor vehicles have been developed so as to have both a classic driving mode with the accelerator pedal and the brake pedal separated between each other, and a driving mode with a single pedal, in which the acceleration and the braking are both controlled only by the accelerator pedal.

In particular, with the driving mode with a single pedal, while a pressure of the accelerator pedal corresponds to an acceleration of the motor vehicle as usual, a release of the accelerator pedal would correspond to a braking of the motor vehicle.

The entity of the acceleration and of the braking correspond to the entity of the variation of the position of the pedal, as well as possibly to the speed with which the variation takes place, for example in a proportional manner.

The driving mode with a single pedal is generally motivated by a maximization principle of the energy efficiency of the motor vehicle.

In fact, the advanced vehicles discussed herein are provided with at least one propulsor defined by an electric machine, i.e. an electric motor generator, so that the braking controlled by the release of the accelerator pedal in the driving mode with a single pedal is performed by the electric machine controlled by the electric generator, so that the braking involves a generation of electric energy storable in a specially provided electric charge storage device, such as a battery, a capacitor, and the like.

However, the driving mode with a single pedal shows evident drawbacks, especially in terms of driving convenience and comfort.

For example, a very common practice of drivers is to release the accelerator pedal, without touching other pedals, so as to make the motor vehicle glide by means of its own inertia.

Furthermore, more in general, the practice of releasing the accelerator pedal, without for this reason braking the motor vehicle, is very commonly utilized by drivers as a further degree of freedom for controlling the forward movement dynamics of the motor vehicle in a subtle and sensitive manner.

Such practice, clearly impossible to be carried out in the driving mode with a single pedal, constitutes an ingrained habit among drivers.

Therefore, drivers can feel a certain unease in adapting to the driving mode with a single pedal and in searching for suitable corrections of the position of the accelerator pedal for obtaining effects similar to those commonly obtained by means of the established practice discussed herein.

In light of this, an object of the invention is to mitigate the drawbacks of the driving mode with a single pedal.

DESCRIPTION OF THE INVENTION

The object is achieved by a process and by an apparatus for controlling the forward movement of a motor vehicle, as defined in the independent claims.

The dependent claims define particular embodiments of the invention.

BRIEF DESCRIPTION OF THE DRAWINGS

The invention will now be described in the following with reference to the accompanying drawings, which illustrate a non-limiting embodiment thereof, wherein.

EMBODIMENTS OF THE INVENTION

Figure 1:
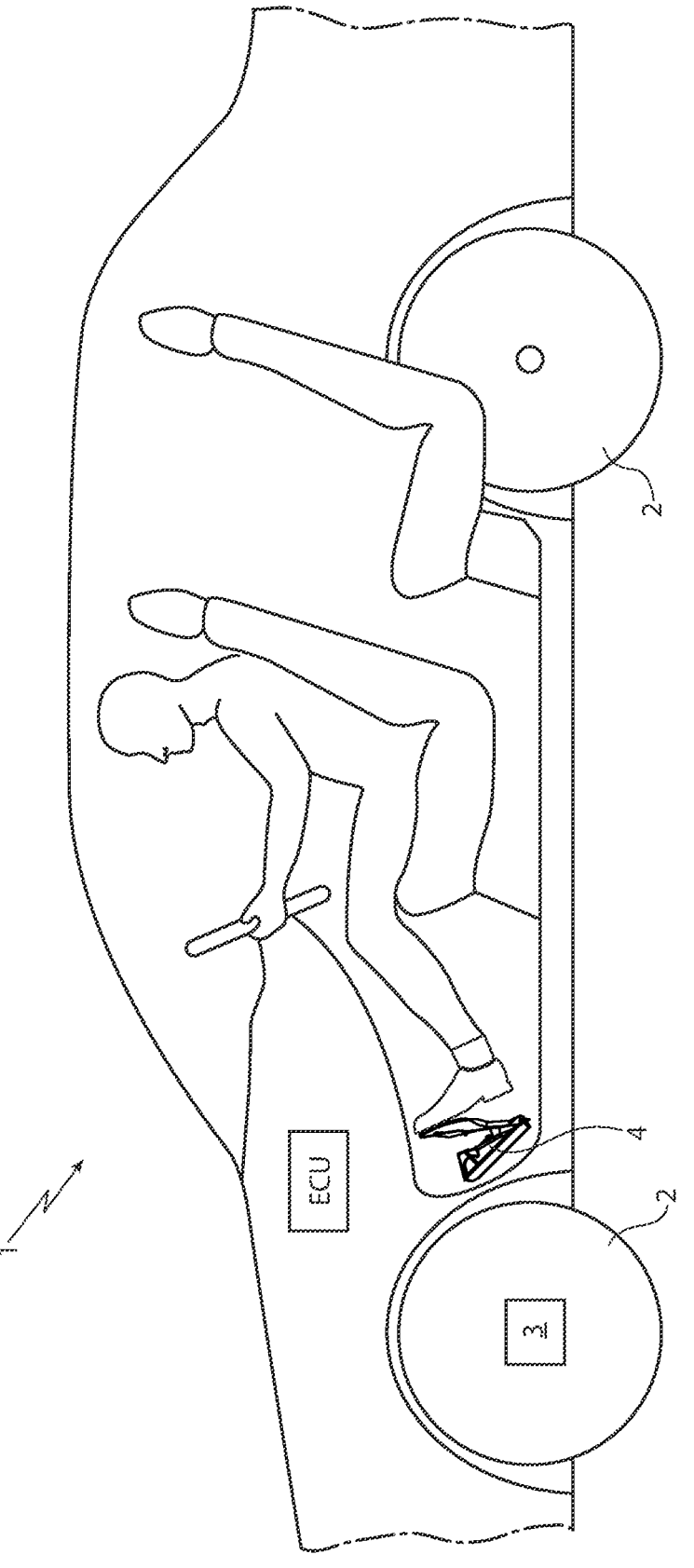
FIG. 1 is a scheme of a motor vehicle comprising an apparatus according to the invention, FIGS. 2A, 2B laterally show a pedal of the motor vehicle in a pressed down configuration and in a further configuration following a partial release of the pedal, respectively.

In FIG. 1, reference numeral 1 indicates, as a whole, a vehicle or more precisely a motor vehicle.

Still in FIG. 1, a driver is present inside a passenger compartment of the motor vehicle 1 and is utilizing the motor vehicle 1.

The motor vehicle 1 comprises a plurality of wheels 2, only two of which are visible in FIG. 1.

Furthermore, the motor vehicle 1 comprises a braking device 3 illustrated in FIG. 1 only schematically at one of the visible wheels 2.

This is not limiting, since the braking device 3 could be applied to one or more wheels 2, for example to the front wheels and/or to the rear wheels, without any loss of generality.

The braking device 3 is configured to brake the motor vehicle 1, in particular under the control of the driver.

The braking device 3 can be a device known per se; for example, the braking device 3 can comprise a disc brake or other known types of brake and possibly a servo actuator, for example of hydraulic type, controllable for operating the brake according to known modes and therefore not described in detail.

Furthermore, the motor vehicle 1 comprises a control 4 controllable or operable by the driver for operating or controlling the braking device 3.

The control 4 is movable and can be arranged in a plurality of positions, for example according to a movement direction A.

Figure 2B:
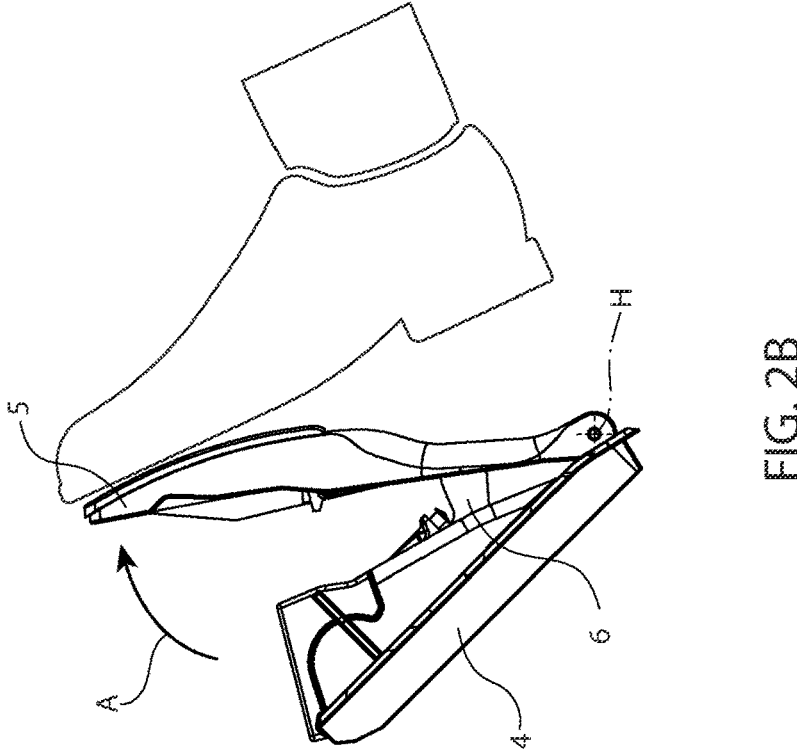
Figure 2A:
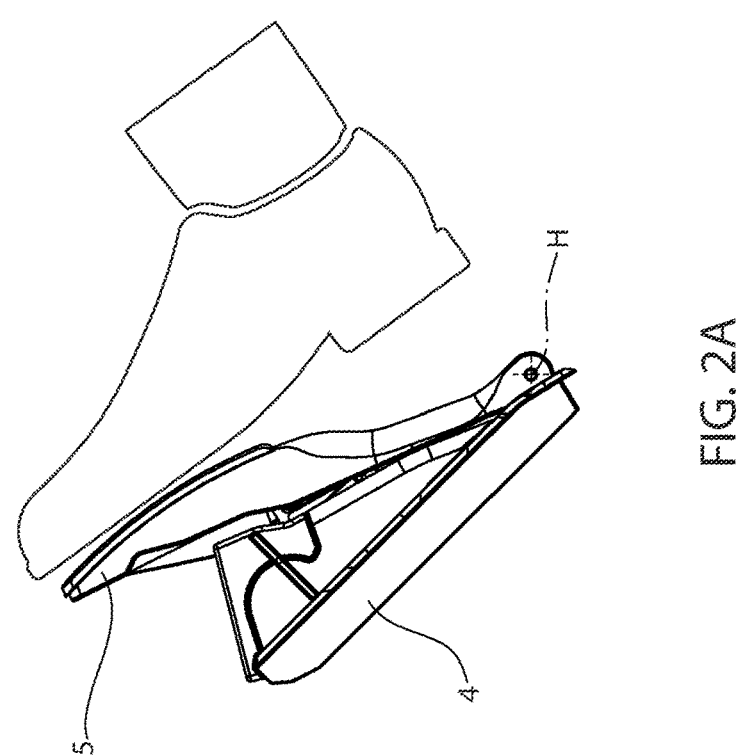

The positions include at least one rest position, in which for example the control 4 does not exert any action on the braking device 3, and an end position (FIG. 2A), i.e. a position in which a movement of the control 4 from the rest position has to stop.

In other words, the end position is a position which cannot be exceeded in the direction of moving away from the rest position.

In particular, the rest position is, in turn, a further end position, thus the control 4 is movable between the rest position and the previous end position along the direction A, more in particular with continuity between the positions.

Therefore, the control 4 is operable by the driver from the rest position toward the end position, in particular according to the direction A.

In the specific example of FIG. 1, although this is not strictly necessary, the control 4 comprises a pedal 5 which can be pressed down by the driver by a foot.

The pedal 5 is pivoted around an axis H, in particular transversal to the direction of forward movement of the motor vehicle 1 and more in particular horizontal.

Therefore, the direction A is a circular direction, thus the pedal 5 is rotatable around the axis H.

The pedal 5 can be pressed down from the rest position toward the end position, i.e. counterclockwise.

Moreover, the motor vehicle 1 comprises a return device 6 configured to automatically return the control 4 to the rest position from any current position of the control 4 following a release of the control 4 by the driver, i.e. when the control is not operated by the driver. Here, the control 4 has a return movement from the current position toward the rest position. Clearly, the driver can stop the return movement before the control 4 reaches the rest position, in particular by operating the control 4 again. The driver can even invert the return movement, i.e. bring the control 4 back toward the end position overcoming the resisting action exerted by the return device 6 on the control 4.

Therefore, the pedal 5 returns to the rest position when released by the return device 6. Here, the pedal 5 rotates clockwise toward the rest position from any current position.

The returning device 6 can comprise any means known to be suitable to carry out its above-described function. For example, the return device 6 could also comprise an elastic member or more precisely a spring arranged for reacting to a rotation of the pedal 5 toward the end position with an elastic reaction torque directed in an opposite manner to the same rotation. Alternatively, the return device 6 could comprise an active actuator for exerting the same elastic reaction torque of the spring or a different torque.

The motor vehicle 1 has a propulsion assembly, known per se and not illustrated, for setting the wheels 2 in motion.

Specifically, the pedal 5 is operable by the driver for controlling the propulsion assembly and therefore for accelerating the motor vehicle 1.

More specifically, the pedal 5 or more in general the control 4 causes the acceleration of the motor vehicle 1 or is configured to accelerate the motor vehicle 1 when it is operated toward the end position, in particular in a manner proportional to the entity of the shifting of the control 4. Here, the control 4 has an activation movement toward the end position.

In greater detail, the motor vehicle 1 comprises a control unit ECU and a transducer configured to detect the activation movement of the control 4, namely one or more characteristics of the activation movement, and to generate a relative signal.

The transducer is coupled to the control unit ECU, such that the later is configured to acquire the signal generated by the transducer and extract from the signal information relative to the activation movement.

From such information, the control unit ECU is configured to determine an acceleration parameter characteristic of the activation movement or more precisely one or more values of the acceleration parameter.

In particular, the acceleration parameter is a dynamic variable, i.e. varies over time.

Preferably, the acceleration parameter assumes real values, i.e. belongs to the field of real numbers.

For example, the acceleration parameter could be indicative of a rotation angle of the pedal 5 from its current position toward the end position, but not necessarily; the acceleration parameter could also be indicative of the speed or of the angular acceleration of the pedal 5 toward the end position or also be indicative of a linear combination of more characteristics of the activation movement, including the rotation angle, the angular speed, the angular acceleration, and the like.

Preferably, the acceleration parameter increases with the increase in the shifting of the control 4 toward the end position and/or in the speed of the control 4 toward the end position and/or in the acceleration of the control 4 toward the end position.

The control unit ECU could control, for example, the propulsion assembly of the motor vehicle 1 as a function of the acceleration parameter determined by the control unit ECU.

Anyway, the control unit ECU is configured to control the propulsion assembly in a manner coherent with the activation movement of the control 4, i.e. in a manner coherent with the extracted information concerning the activation movement.

Furthermore, the same transducer or another transducer can be configured to detect the return movement of the control 4, i.e. characteristics of the return movement, such as the rotation angle of the pedal 5 from the current position, the angular speed, the angular acceleration, and the like. The transducer that detects the return movement is also configured to generate a return signal associated with the detected return movement.

The control unit ECU is coupled to the later transducer and is configured to extract from the return signal information concerning the return movement.

The control unit ECU is configured to determine a braking parameter being characteristic of the return movement or more precisely one or more values of the braking parameter; in particular, the control unit ECU determines the braking parameter from the information extracted from the return signal.

It goes without saying that the braking parameter is characteristic of any return movement, i.e. a movement of the pedal 5 from any position toward the rest position. Therefore, the control unit ECU keeps track of any return movement of the pedal 5, from any current position of the pedal 5, by the braking parameter.

Similar to the acceleration parameter, although not necessarily, the braking parameter is a dynamic variable, i.e. varies over time.

Preferably, the braking parameter assumes real values, i.e. belongs to the field of real numbers.

The braking parameter can be indicative, for example, of a rotation angle of the pedal 5 from its current position toward the rest position, but not necessarily; the acceleration parameter could also be indicative of the speed or of the angular acceleration of the pedal 5 toward the rest position or also be indicative of a linear combination of more characteristics of the return movement.

Preferably, the braking parameter increases with the increase in the shifting of the control 4 toward the rest position and/or in the speed of the control 4 toward the rest position and/or in the acceleration of the control 4 toward the rest position.

The control unit ECU is configured to control the braking device 3 as a function of the determined braking parameter.

Implicitly, but not necessarily, the control unit ECU can brake or be configured to brake the motor vehicle 1 by the control of the braking device 3, as a function of the determined braking parameter, every time there is the return movement, i.e. more precisely from any current position of the pedal 5 and/or independently of the return movement entity, i.e. every time the pedal 5 moves toward the rest position.

In particular, the braking device 3 is controlled so that the entity of the braking of the motor vehicle 1 increases with the shifting of the control 4 toward the rest position and/or with the speed of the shifting and/or with the acceleration of the shifting, i.e. with the increase in the braking parameter.

Besides the braking parameter, the control unit ECU is configured to determine one or more additional parameters.

The additional parameters can be extracted by the control unit ECU from information coming from transducers of the motor vehicle 1 and/or from information coming from the outside of the motor vehicle 1, for example from public or private telecommunication systems, possibly according to commonly known or anyway standard protocols.

The additional parameters can concern states or conditions of the motor vehicle 1 and/or states or conditions of the road that the motor vehicle 1 is travelling.

Each of the additional parameters can be a dynamic variable, i.e. can be variable over time.

Furthermore, each of the parameters can belong to a field of real numbers, rational numbers, integers, or rather be a variable of logic type or even belong to the field of qualitative attributes.

Preferably, the additional parameters are determined by the control unit ECU by processing the information available to the control unit ECU according to a protocol known by the acronym ADASIS (Advanced Drivers Assistant System Interface Specifications).

In greater detail, the available information can include, the geolocation of the motor vehicle 1 by a GPS receiver of the motor vehicle 1 and a GPS positioning system adapted to cooperate with the GPS receiver, a stored road map of a zone arranged around the motor vehicle 1, information on the road traffic by a specially provided receiver of the motor vehicle 1 adapted to receive such information from public or private services that monitor the traffic on the road network, information coming from advanced drivers assistant systems of the motor vehicle 1 according to the standards known by the acronym ADAS (Advanced Drivers Assistant System), information coming from sensors of the motor vehicle 1 which enable the control unit ECU to apply odometry techniques, and the like.

The mentioned sensors, systems, and receivers could be of known type and are coupled to the control unit ECU for allowing the later to receive the information and thus process it, in particular according to the ADASIS protocol, so that the control unit ECU determines the additional parameters.

The road map can include further information useful for determining the additional parameters relative to characteristics of the roads, such as road type (urban, interurban, motorway, bridge, tunnel, roundabout, square, car park, pedestrian zone, intersection, etc.), number of road lanes, dimensions of the carriageway, dimensions of the lanes, angles or radiuses of the curves, driving rules associated with the roads (permitted speed limits, obligations to give way, wrong ways, no transits, obligations to stop and give way, obligations to turn right or left, etc.), presence of devices or temporary situations limiting the traffic (for example traffic lights, movable bollards, obligatory detours, presence of accidents or intense traffic, etc.), and the like.

The road map can be constantly updated, for example by information coming from public or private services that update the road maps.

Each of the additional parameters is representative of one among

- a morphological state of a portion of the road in front of the motor vehicle 1,
- a regulatory state associated with one or more road rules applied to the portion of the road in front of the motor vehicle 1,
- a traffic state associated with one or more entities, for example vehicles, objects, or living beings, passing on the portion of the road in front of the motor vehicle 1,
- a kinematic state of the motor vehicle 1.

The portion of the road in front of the motor vehicle 1 is determined by the control unit ECU on the stored road map based on the information concerning the geolocation of the motor vehicle 1, i.e. the current position of the motor vehicle 1 on the road map.

In greater detail, the current position can be determined by the control unit ECU based on estimates, for example made according to known modes or according to the ADASIS protocol, as a function of the geolocation information actually available to the control unit ECU.

For example, the control unit ECU can calculate in real time the route taken by the motor vehicle, in such manner determining for every instant the current position as the last calculated position of the route currently taken. For example, the taken route can be calculated on the road map by merging the information relative to the GPS signals received by the GPS receiver, the speed of the motor vehicle 1, the delays in the reception/processing of signals by the control unit ECU, the orientation of the motor vehicle 1, the statistical confidence on the relevant information, the lane travelled by the motor vehicle 1.

A parameter representative of the morphological state could be a parameter indicative of a width of the lane (real parameter), a number of lanes (integer parameter), a presence of a curve (logical parameter), a slope of the road (real parameter), a qualitative attribute of the road (for example, dirt road, icy road, rough road, wet road, dusty road, etc.), and the like.

A parameter representative of the morphological state could also be a vector or matrix parameter, i.e. a parameter having a dimension greater than one, i.e. a parameter composed of a plurality of information. This is the example of a parameter indicative of a road profile; in particular, for example, the road profile can be expressed by means of one or more bidimensional curves in sequence, understood according to the mathematical meaning of curve. Each curve can be represented with a polynomial equation, the coefficients of which arranged in order in a vector could define a parameter indicative of the road profile. Similarly, a matrix containing in order in the columns or in the rows the respective coefficients of the polynomial equations of the curves in sequence could be a parameter representative of the road profile.

Specifically, a parameter representative of the morphological state determined by the control unit ECU is a slope parameter indicative of the slope of the road portion.

Alternatively or additionally, a parameter representative of the morphological state determined by the control unit ECU is a geometrical parameter indicative of the bidimensional geometrical profile of the road portion, i.e. indicative of the shape (generically curvilinear) of the road portion, as already mentioned above.

A parameter representative of the regulatory state could be a parameter indicative of a speed limit (real parameter), a traffic light state (logical and integer parameter), a presence of a specific obligation or hazard (Boolean parameter).

A parameter representative of the traffic state could be a parameter indicative of a distance of an entity in front of the motor vehicle 1, a speed of the entity, an acceleration of the entity, and the like.

The entity can be any thing/being, such as a vehicle, a human being, an animal, or even an object moving or passing or also possibly stationary along the portion of the road in front of the motor vehicle 1.

The distance can be generic or along a specific direction, for example along the direction of forward movement of the motor vehicle.

Other parameters representative of the traffic state could be parameters indicative of the presence of particular traffic conditions (Boolean parameters), such as the presence of a queue of vehicles, the presence of pedestrians crossing or getting ready to cross the road portion, the presence of a vehicle having special priorities such as a public transport means, a rescue vehicle, and the like.

Specifically, a parameter representative of the traffic state determined by the control unit ECU is one among a distance parameter, a speed parameter, and an acceleration parameter, respectively indicative of a distance, in particular at the front, of the motor vehicle 1 from an entity passing or stationary along the portion of the road in front of the motor vehicle 1, a speed of the entity, and an acceleration (be it positive or negative, or more preferably only negative, i.e. a deceleration) of the entity.

More specifically, the control unit ECU determines any two or all among the distance parameter, the speed parameter, and the acceleration parameter mentioned above.

A parameter representative of the kinematic state of the motor vehicle 1 could be a parameter indicative of a position of the motor vehicle 1, a speed of the motor vehicle 1, a lateral acceleration of the motor vehicle 1, a longitudinal acceleration of the motor vehicle 1, an orientation of the motor vehicle 1, a steering angle of the motor vehicle 1, and the like.

Each of the mentioned later parameters can be a scalar, vector or matrix parameter, without any loss of generality. Furthermore, also each one between the braking parameter and the acceleration parameter can be independently a scalar, vector, or matrix parameter. In particular, the braking parameter can include, for example, three scalar values indicative of the shifting, speed and acceleration of the control 4, respectively, or also any two of these scalar values.

In particular, the control unit ECU determines one or both between a longitudinal acceleration parameter and a lateral acceleration parameter indicative of a longitudinal and lateral acceleration of the motor vehicle 1, respectively.

Furthermore, the control unit ECU preferably determines a speed parameter of forward movement indicative of the speed of the motor vehicle 1.

Furthermore, the control unit ECU preferably determines a position parameter indicative of the position of the motor vehicle 1 (for example in terms of terrestrial latitude and longitude).

According to the invention, the control unit ECU is configured to brake the motor vehicle 1 by controlling the braking device 3 as a function of the braking parameter and of the determined additional parameters.

In greater detail, the control unit ECU is configured to generate a signal corresponding to a desired braking torque for the motor vehicle 1 as a function of the braking parameter and of the determined additional parameters.

Therefore, the control unit ECU is configured to set the signal, i.e. more precisely the braking torque signal, as a braking target or braking set-point in the control jargon.

Therefore, the control unit ECU is configured to control the braking device 3 based on the set braking target.

More precisely, the control unit ECU could control the braking device 3 in an open loop, i.e. operating the braking device 3 by a control assumed as corresponding to a braking result coherent with the set braking target based on the knowledge a priori of the braking device 3. Alternatively, the control unit ECU could control the braking device 3 in a closed loop, i.e. for example according to a control law based on a comparison of a feedback signal indicative of the actual braking torque with the braking target.

Preferably, the signal corresponding to the desired braking torque comprises a series of values in time sequence, i.e. represents a course over time of a magnitude or variable indicative of the braking torque. In other words, the signal extends in the time domain. The signal can be continuous or discrete, without any loss of generality.

For example, the control unit ECU calculates the signal as the output of a function applied to inputs defined by respective values of the braking parameter and of the additional parameters, where the values are preferably associated with a time instant, in particular the current time instant.

Therefore, the braking target determines the future result of the braking, based on current values.

In particular, the signal is calculated by a function linking a set of inputs defined by the braking parameter and by the additional parameters to an output defined by the signal.

In turn, the function is determined by the control unit ECU by identification.

According to an example, the function is identified as solution of an optimal control problem, i.e. minimizing or maximizing a further optimization function or cost function.

In other words, the function comprises unknown elements or parameters, therefore the solution of the optimal control problem is given by the optimal values of the unknown parameters, i.e. the values that minimize or maximize the function.

Furthermore, the function comprises known elements or parameters, in turn comprising the inputs of the aforementioned set. The inputs could possibly define respective state variables of the optimal control problem.

In particular, the optimization function is a function indicative of the energy expenditure or of the energy recovery.

In fact, the braking device 3 could also comprise an electric motor generator coupled to the wheels 2 and configured to operate as generator so as to brake the motor vehicle 1 generating electric energy.

In this manner, a braking of greater entity, i.e. a greater braking torque involves a greater energy recovery or energy generation.

The minimization or maximization of the optimization function can be subject to constraints which can be expressed as functions of one or more of the inputs or more precisely of one or more of the additional parameters. The constraints are configured to assure the safety, effectiveness and reliability of the braking, possibly to the detriment of the energy recovery, as a function of the additional parameters.

According to a further example, the function is identified by applying a model identification method from experimental data.

The model identification methods from experimental data are normally applied to a plurality of experimental detections of the output associated with respective experimental detections of the inputs.

More precisely, the experimental detections of the output comprise one or more values indicative of an actual braking torque of the motor vehicle 1 or of another motor vehicle during an experimental use. In fact, the experimental detections of the output, i.e. experimental detections related to the desired braking torque, are considered, treated or set as the output of the function to be identified.

Each of the experimental detections of the outputs can be a time sequence of values indicative of the actual braking torque, which forms a signal in the time domain, for example continuous or discrete.

For each of the experimental detections of the outputs, the experimental detections of the inputs are a corresponding set of detected values of the braking parameter and of the additional parameters. The later values or more in general the braking parameter and the additional parameters are considered, treated or set as the input of the function to be identified.

This involves that the identified function results to be configured to emulate the conditions of the experimental use, which is advantageous for example when the experimental use is carried out by a dedicated professional. In fact, for example, the dedicated professional can preferably adopt a driving style adapted to the maximization or minimization of the target function, i.e. in particular to the optimization of the energy expenditure or of the energy recovery, still preferably keeping a human discretion for balancing his/her driving style aimed at the optimization with reasonable behaviours of the common drivers, so that the identified function and consequently the braking target correspond to an advantageous balancing of the optimization needs and of the driving comfort and/or pleasantness.

The motor vehicle utilized for the experimentation can be any suitable motor vehicle, for example a motor vehicle having a throttle control and a brake control separated between each other. Clearly, the control unit of the utilized motor vehicle will have to be able to determine the inputs and the outputs necessary for the identification of the function.

The known model identification methods are many, among which for example the methods where the link between the inputs and the output is assumed as a transfer function in the frequency domain defined as a ratio of polynomials in the Laplace variable, the coefficients of which are the parameters of the model to be identified.

For a merely exemplifying but not necessarily limiting purpose, should the coefficients be in a much smaller number than the number of available samples of the inputs and of the output or for example less than twenty in absolute sense, the identification methods based on techniques that assume a sparse representation of the link between inputs and output (e.g. basis pursuit) can be optionally utilized.

Alternatively, the model identification methods can preferably comprise or be created by means of an algorithm belonging to the sphere of artificial intelligence, among which specifically a supervised machine learning algorithm, in particular based on the use of neural networks.

Still more specifically, the machine learning algorithm can be any one among the following known algorithms: K-Nearest Neighbour, Support Vector Machine, Linear Discriminant Analysis, Probabilistic Neural Network, etcetera.

The above-described examples can be combined with each other. In fact, in particular, the function could be obtained by combining more functions, among which a function identified by the experimental detections, possibly obtained during an experimental use carried out by a normal driver or also instructed to behave in a natural manner, and a function which introduces an optimization contribution of the braking target in the view of optimizing the energy expenditure or the energy recovery.

For this reason, in general, the signal corresponding to the desired braking torque can be preferably calculated by a function identified with the application of a model identification method from experimental data, but not necessarily only by such function. Other functions of the inputs or of a portion thereof can, for example, come into play in the calculation, based on the needs.

Figure 3:
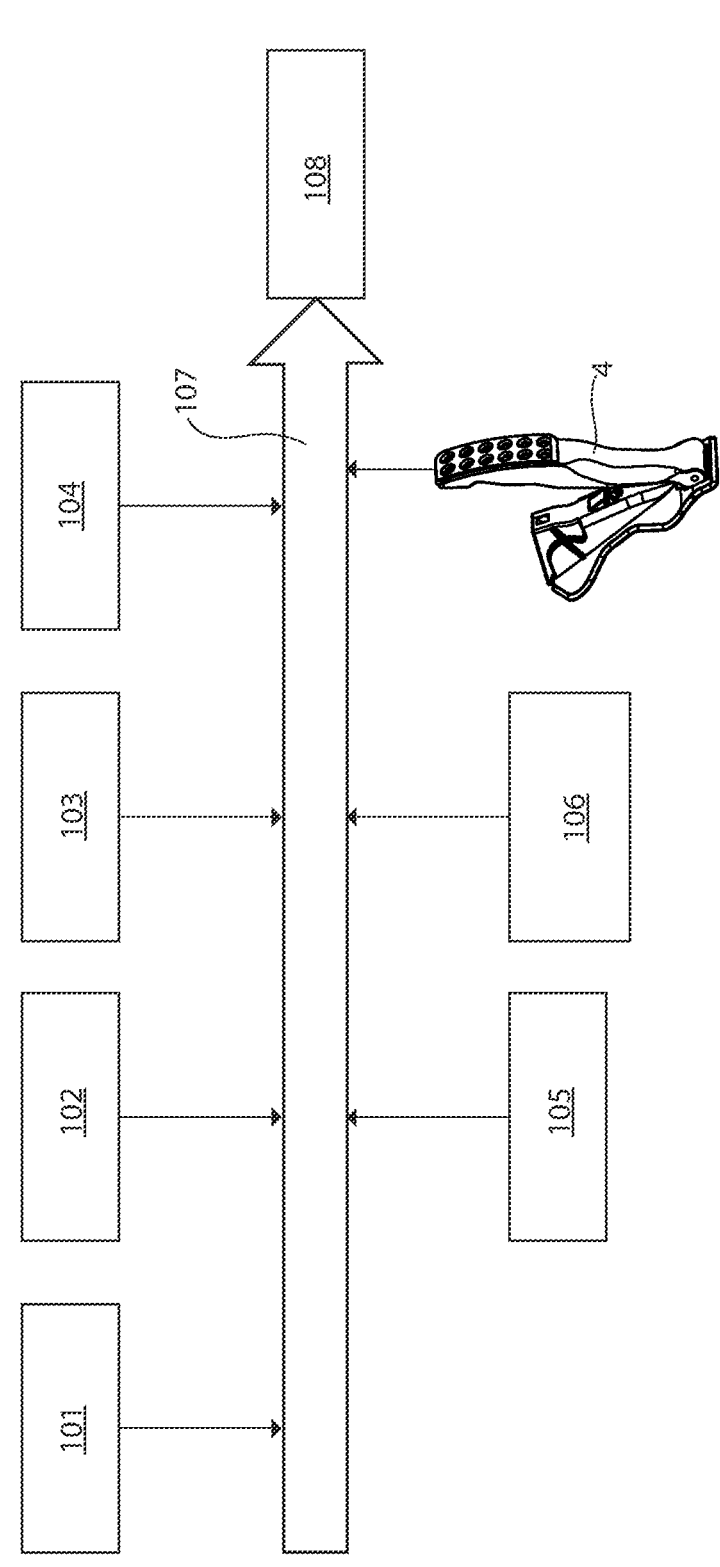
FIGS. 3, 4 are block diagrams that represent steps of a process according to the invention.

FIG. 3 schematizes the calculation of the signal corresponding to the desired braking torque.

Blocks 101, 102, 103, 104, 105, 106 represent the current values of six groups of parameters, respectively.

Block 101 specifically represents the current values of the parameters indicative of the longitudinal acceleration and of the lateral acceleration of the motor vehicle 1.

Independently, block 102 specifically represents the current values of the parameters indicative of the traffic state; more in particular, block 102 represents the current value of a parameter indicative of the time estimated for colliding with an entity in front of the motor vehicle 1.

Independently, block 103 specifically represents the current value of a parameter indicative of the slope of the road travelled by the motor vehicle 1.

Independently, block 104 specifically represents the current value of the braking parameter.

Independently, block 105 specifically represents the current values of parameters determined by utilizing information processed by the ADASIS protocol.

Independently, block 106 specifically represents the current value of a parameter indicative of the road profile of the road travelled by the motor vehicle 1.

In FIG. 3, block 107 represents the function that links the inputs specifically represented by blocks 101, 102, 103, 104, 105, 106 to the output represented by block 108, in turn representative of the signal corresponding to the desired braking torque.

Preferably, the function for determining the signal can be updated by the control unit ECU based on experimental detections acquired during the actual use of the motor vehicle 1.

Figure 4:
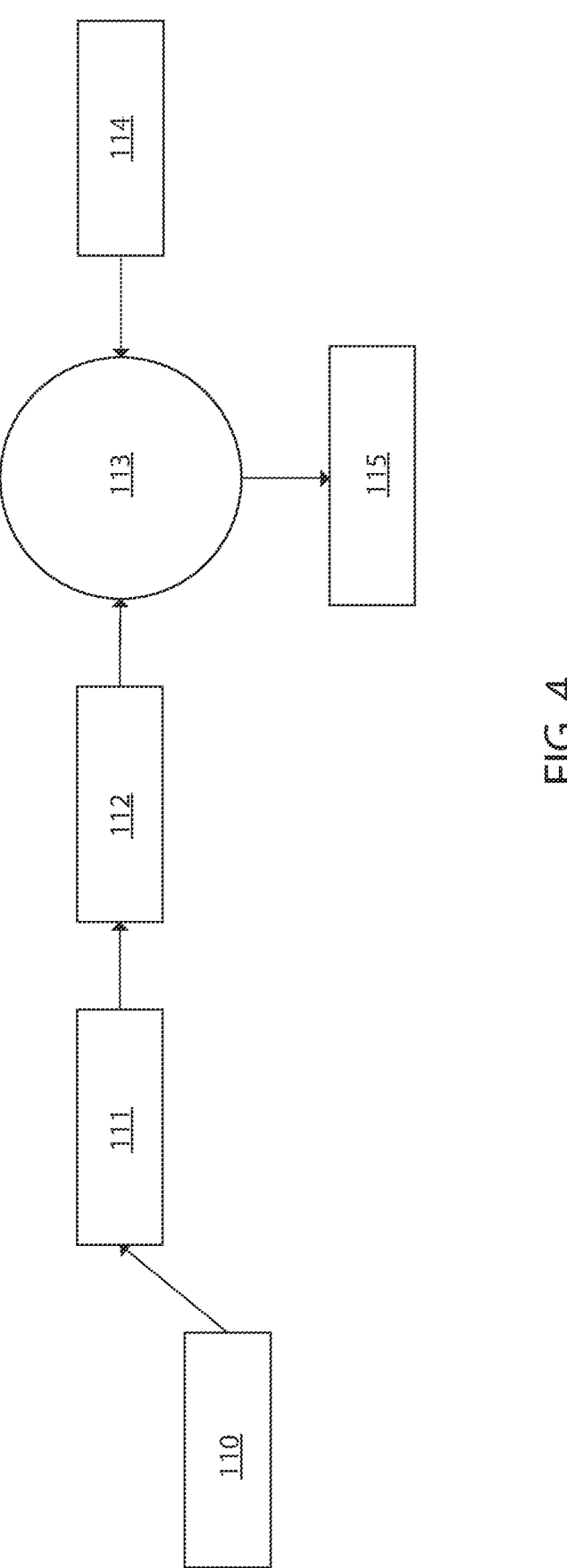

FIG. 4 is a block diagram that illustrates the steps of the first identification of the function and the step of the following update of the function.

In FIG. 4, block 110 represents the acquisition of the first experimental detections during an experimental use of a motor vehicle, which could be identical to the motor vehicle 1 or a typical motor vehicle, carried out by the dedicated professional.

Block 111 represents the constitution of the experimental data on which to apply the first model identification method from experimental data; this takes place by associating the experimental detections with the detected values of the inputs of the function to be identified.

Block 112 represents the first identification of the function from the constituted experimental data.

The update preferably takes place by the identification of one or more functions by identification methods based on artificial intelligence techniques.

Block 113 of FIG. 4 represents the update of the function by the artificial intelligence techniques, from the acquisition of further experimental data represented by block 114.

Block 115 represents the determination of the braking target by the updated function.

According to an example, the update of the function takes place based on, namely as a function of, values of the acceleration parameter acquired or determined by the control unit ECU when the activation movement occurs while the motor vehicle 1 is braking coherently with the braking target, namely acquired at or in association with the occurrence of the activation movement while the motor vehicle 1 is braking.

In other more practical and general words, the update of the function takes place as a function of the corrections of the driver who moves the control 4 toward the end position while the motor vehicle 1 is braking. In fact, such corrections are quantified or identified by the acceleration parameter evaluated by the control unit ECU during a braking of the motor vehicle 1. Here, for clarity, the evaluation of a parameter can be understood as the determination of its values.

In particular, the update of the function takes place by a further identification with the application of a further model identification method from experimental data.

In this example, the further identification is similar to the previous one.

Here, though, the experimental detections alternatively or additionally comprise one or more values of the actual braking torque of the motor vehicle 1, where the actual braking torque is still treated, considered or set as the output of the updated function to be identified or of the function to be updated by the further identification.

More precisely, each of the alternative or additional experimental detections comprises one or more values of the actual braking torque of the motor vehicle 1. For clarity, in fact, the later experimental detections can replace or be additional to the previous experimental detections by which the first identification of the function has taken place.

Each of the alternative or additional experimental detections is acquired by the control unit ECU in association with a corresponding set of respective detected values for the inputs of the updated function to be identified or of the function to be updated. Here, the inputs are identical to the previous inputs with the convenient but not necessary addition of the acceleration parameter.

In fact, the addition of the acceleration parameter is not necessary because the later can also only serve as a "trigger" for identifying the experimental detections to be utilized for the update, without the actual values of the acceleration parameter being considered inputs of the function to be updated.

The further model identification method from experimental data can comprise or be created by means of an algorithm belonging to the sphere of artificial intelligence, among which specifically a supervised machine learning algorithm, in particular based on the use of neural networks.

Still more specifically, the machine learning algorithm can be any one among the following known algorithms: K-Nearest Neighbour, Support Vector Machine, Linear Discriminant Analysis, Probabilistic Neural Network, etcetera.

The values detected for the inputs are considered by the control unit ECU in the identification only if detected at or in association with a braking of the motor vehicle 1.

According to a further example, the control unit ECU is configured to identify a corrective function for correcting said function by the application of a further model identification method from experimental data on a plurality of experimental detections each comprising one or more values indicative of a discrepancy between the actual braking torque of the motor vehicle utilized during the experimentation and the actual braking torque of the motor vehicle 1, where the values of the inputs corresponding to the two actual braking torques, respectively, are the same or approximately identical according to a tolerance defined by a pre-established threshold preferably stored in the control unit ECU.

Each of the later experimental detections is considered, treated or set as the output of the corrective function to be identified and is acquired when the activation movement occurs while the motor vehicle 1 is braking. In other words, the experimental detections are the ones associated with the occurrence of the activation movement while the motor vehicle 1 is braking.

Furthermore, each of the experimental detections is associated with or has an association with the corresponding detected values of the inputs, which are in turn considered, treated or set as the inputs of the corrective function to be identified.

Therefore, the control unit ECU is configured to update said function by the identified corrective function.

The corrective function can, for example, replace the previous function or can possibly apply a correction to the output of the previous function. In particular, the corrective function adds the discrepancy between the actual torques to the output of the previous function, so as to make the correction of the driver not necessary.

The further model identification method from experimental data can comprise or be created by means of an algorithm belonging to the sphere of artificial intelligence, among which specifically a supervised machine learning algorithm, in particular based on the use of neural networks.

Still more specifically, the machine learning algorithm can be any one among the following known algorithms: K-Nearest Neighbour, Support Vector Machine, Linear Discriminant Analysis, Probabilistic Neural Network, etcetera.

The discrepancy between the torques could be indicative or expressed in terms of a difference between the torques, a ratio between the torques, and the like, without any loss of generality.

The corrective function keeps into account the personal driving style of the driver of the motor vehicle 1. In fact, the corrective function is identified based on the corrections performed by the driver, where a correction is understood as the execution of the activation movement while the motor vehicle 1 is braking.

The correction modifies the actual braking torque of the motor vehicle 1, thus causing the discrepancy with the braking torque determined during the experimentation in similar or identical conditions.

The driving conditions, in fact, are dictated by the inputs, i.e. by the braking parameter and by the determined additional parameters.

The control unit ECU is part of an apparatus for controlling the forward movement or at least the braking of the motor vehicle 1. In fact, the braking is part of the forward movement of the motor vehicle 1.

The apparatus further comprises the braking device 3, the control 4, and the return device 6.

The control unit ECU is configured to perform a process for controlling the forward movement or at least the braking of the motor vehicle 1.

The process comprises the steps of a. determining at least a first parameter being characteristic of the return movement, i.e. in particular the braking parameter, b. determining one or more additional parameters, each of which is representative of one among a morphological state of a portion of the road in front of the motor vehicle 1, a regulatory state associated with one or more road rules applied to the portion of the road in front of the motor vehicle 1, a traffic state associated with one or more entities, for example vehicles, objects or living beings, passing on the portion of the road in front of the motor vehicle 1, a kinematic state of the motor vehicle 1, and c. braking the motor vehicle 1 by controlling the braking device 3 as a function of the first parameter and of the determined additional parameters.

Furthermore, preferably, the one or more additional parameters include at least a first parameter representative of said morphological state.

More in particular, the additional parameters also include at least a second and a third parameter representative of said traffic state and of said kinematic state, respectively.

Furthermore, the additional parameters preferably also include at least a fourth parameter representative of said regulatory state.

Conveniently, step c. further comprises the steps of d. generating a signal corresponding to a desired braking torque for the motor vehicle 1 as a function of the first parameter and of the determined additional parameters, e. setting said signal as a braking target, and f. controlling the braking device 3 based on the set braking target.

Preferably, the signal generated during step d. is calculated by a function linking a set of inputs defined by the first parameter and the additional parameters to an output defined by said signal, the function being in turn determined by at least a first identification of the function by an application of a model identification method from experimental data on a plurality of first experimental detections each comprising one or more values indicative of an actual braking torque of a further motor vehicle having a throttle control and a brake control separated between each other, where each of the first experimental detections is set as the output of the function to be identified and is acquired in association with a corresponding set of first detected values of the first parameter and of the additional parameters, the first detected values being in turn set as the inputs of the function to be identified.

According to a preferred embodiment, the process further comprises the steps of

14 g. determining a second parameter being characteristic of the activation movement when the activation movement occurs while the motor vehicle 1 is braking during step c., and h. updating said function based on the determined second parameter.

Preferably, step h. comprises a second identification of said function for an update thereof, wherein the second identification comprises and application of a further model identification method from experimental data on a plurality of second experimental detections each comprising one or more values indicative of an actual braking torque of the motor vehicle 1, where each of the second experimental detections is set as the output of the function to be updated and is acquired in association with a corresponding set of second detected values of the first parameter, the additional parameters, and preferably the second parameter, the second detected values being in turn set as the inputs of the function to be updated.

According to a further embodiment, the process further comprises the steps of i. identifying a corrective function for correcting said function by an application of a further model identification method from experimental data on a plurality of third experimental detections each comprising one or more values indicative of a discrepancy between the actual braking torque of the further motor vehicle and an actual braking torque of the motor vehicle 1, where each of the third experimental detections is set as the output of the corrective function to be identified and is acquired when the activation movement occurs while the motor vehicle is braking during step c. and in association with the corresponding set of first detected values, the first detected values being in turn set as the inputs of the corrective function to be identified, and j. updating said function by the identified corrective function.

Based on the foregoing, the advantages of the process and of the apparatus according to the invention are evident.

The apparatus and the process according to the invention produce an adaptation of the braking conditions of the motor vehicle as a function of the driving conditions, with particular reference to the road and traffic conditions, besides merely as a function of the use of the control 4.

The adaptation essentially serves for improving the driving comfort, convenience and pleasantness.

Furthermore, the adaptation can additionally be considered for an energy optimization, so that the driving pleasure results coupled to a prudent energy expenditure according to a correct balancing of the factors.

In particular, the apparatus or the process establish in an automated and reliable manner, without any particular intervention of the driver, the moment when the return movement has to correspond to a braking or to a mere gliding of the motor vehicle 1, possibly as a function of the greater energy convenience.

Furthermore, the apparatus or the process determine the entity of the braking based on the conditions of the road and of the traffic, so as to maximize the safety of the motor vehicle 1.

Still additionally, thanks to the update of the identified first function, the braking of the motor vehicle 1 is calibrated as a function of the specific driving style of the owner and driver of the motor vehicle 1.

Finally, it is clear that modifications and variations can be made to the process and to the apparatus according to the invention which however do not depart from the scope of protection defined by the claims.

For clarity, it is highlighted that numeral adjectives such as first, second, third, etcetera, do not necessarily have a limiting value but are utilized only so as to prevent misunderstandings. In other words, the adjective first does not necessarily imply that there is also a second object, as well as the adjective second does not imply that a first object necessarily exists. Furthermore, distinct numeral adjectives could also refer to coinciding or different objects, without any loss of generality.

Furthermore, optionally, the various examples described can be combined with each other so as to form further embodiments which are not further specified because implied by the combination of the examples.

The invention claimed is:

1. A process for controlling the forward movement of a motor vehicle, the motor vehicle comprising a braking device, a control operable by a driver from a rest position toward an end position, wherein the motor vehicle is configured to accelerate when the control is operated toward the end position, such that the control has an activation movement toward the end position, and return means configured to automatically return the control to the rest position from any of its current positions following a release of the control by the driver, such that the control has a return movement from the current position toward the rest position, the process comprising the steps of:

a. determining at least a first parameter being characteristic of the return movement, b. determining one or more additional parameters, each of which is representative of one among:

a morphological state of a portion of the road in front of the motor vehicle, a regulatory state associated with one or more road rules applied to the portion of the road in front of the motor vehicle, a traffic state associated with one or more entities, such as vehicles, objects, or living beings, passing on the portion of the road in front of the motor vehicle, a kinematic state of the motor vehicle, and c. braking the motor vehicle by controlling the braking device as a function of the determined first parameter and the determined additional parameters, wherein step c. comprises:

d. generating a signal corresponding to a desired braking torque for the motor vehicle as a function of the determined first parameter and the determined additional parameters, e. setting said signal as a braking target, and f. controlling the braking device based on the set braking target, wherein the signal generated during step d. is calculated by a function linking a set of inputs defined by the first parameter and the additional parameters to an output defined by said signal, the function being in turn determined by at least a first identification of the function by an application of a model identification method from experimental data on a plurality of first experimental detections each comprising one or more values indicative of an actual braking torque of a further motor vehicle having a throttle control and a brake control separated between each other, where each of the first experimental detections is set as the output of the function to be identified and is acquired in association with a corresponding set of first detected values of the first parameter and of the additional parameters, the first detected values being in turn set as the inputs of the function to be identified.

2. The process according to claim 1, wherein the one or more additional parameters include at least a first parameter representative of said morphological state.

3. The process according to claim 2, wherein the one or more additional parameters also include at least a second and a third parameter representative of said traffic state and said kinematic state, respectively.

4. The process according to claim 2, wherein the additional parameters also include at least a fourth parameter representative of said regulatory state.

5. The process according to claim 1, further comprising the steps of g. determining a second parameter being characteristic of the activation movement when the activation movement occurs while the motor vehicle is braking during step c., and h. updating said function based on the determined second parameter.

6. The process according to claim 5, wherein step h. comprises a second identification of said function for an update thereof, wherein said second identification comprises an application of a further model identification method from experimental data on a plurality of second experimental detections each comprising one or more values indicative of an actual braking torque of the motor vehicle, where each of the second experimental detections is set as the output of the function to be updated and is acquired in association with a corresponding set of second detected values of the first parameter, the additional parameters, and the second parameter, the second detected values being in turn set as the inputs of the function to be updated.

7. The process according to claim 1, further comprising the steps of i. identifying a corrective function for correcting said function by an application of a further model identification method from experimental data on a plurality of third experimental detections each comprising one or more values indicative of a discrepancy between the actual braking torque of the further motor vehicle and an actual braking torque of the motor vehicle, where each of the third experimental detections is set as the output of the corrective function to be identified and is acquired when the activation movement occurs while the motor vehicle is braking during step c. and in association with the corresponding set of first detected values, the first detected values being in turn set as the inputs of the corrective function to be identified, and j. updating said function by the identified corrective function.

8. An apparatus for controlling the forward movement of a motor vehicle, the apparatus comprising a braking device, a control operable by a driver of the motor vehicle from a rest position to an end position, and return means configured to automatically return the control to the rest position from any of its current positions following a release of the control by the driver, such that the control has a return movement from its current position to its rest position, the apparatus being characterized by comprising a control unit configured to perform the process according to claim 1.

9. A process for controlling the forward movement of a motor vehicle, the motor vehicle comprising a braking device, a control operable by a driver from a rest position toward an end position, wherein the motor vehicle is configured to accelerate when the control is operated toward the end position, such that the control has an activation movement toward the end position, and return means configured to automatically return the control to the rest position from any of its current positions following a release of the control by the driver, such that the control has a return movement from the current position toward the rest position, the process comprising the steps of:

determining at least a first parameter being characteristic of the return movement;

determining one or more additional parameters, each of which is representative of one among:

a morphological state of a portion of the road in front of the motor vehicle;

a regulatory state associated with one or more road rules applied to the portion of the road in front of the motor vehicle;

a traffic state associated with one or more entities, such as vehicles, objects, or living beings, passing on the portion of the road in front of the motor vehicle;

a kinematic state of the motor vehicle; and braking the motor vehicle by controlling the braking device as a function of the determined first parameter and the determined additional parameters, said braking step comprising:

generating a signal corresponding to a desired braking torque for the motor vehicle as a function of the determined first parameter and the determined additional parameters;

setting said signal as a braking target; and controlling the braking device based on the set braking target, wherein the signal is calculated by a function linking a set of inputs defined by the first parameter and the additional parameters to an output defined by said signal, the function being in turn determined by at least a first identification of the function by an application of a model identification method from experimental data on a plurality of first experimental detections each comprising one or more values indicative of an actual braking torque of a further motor vehicle having a throttle control and a brake control separated between each other, where each of the first experimental detections is set as the output of the function to be identified and is acquired in association with a corresponding set of first detected values of the first parameter and of the additional parameters, the first detected values being in turn set as the inputs of the function to be identified, and wherein the one or more additional parameters include at least a first parameter representative of said morphological state.

10. The process of claim 9, wherein the one or more additional parameters include a second parameter representative of said kinematic state.

11. The process of claim 10, wherein the one or more additional parameters include a third parameter representative of said traffic state.

* * * * *